Feb. 19, 1963 CARL-ERIK GRANQVIST 3,078,351

SOUND OR PULSE RECORDING AND REPRODUCING APPARATUS

Filed Nov. 24, 1958 2 Sheets-Sheet 1

INVENTOR
Carl-Erik Granqvist

BY Larson and Taylor
ATTORNEY

INVENTOR
Carl-Erik Granqvist

BY Lawson and Taylor
ATTORNEY

United States Patent Office 3,078,351
Patented Feb. 19, 1963

3,078,351
SOUND OR PULSE RECORDING AND REPRODUCING APPARATUS

Carl-Erik Granqvist, Lidingo, Sweden, assignor to Svenska Aktiebolaget Gasaccumulator, Lidingo, Sweden, a corporation of Sweden Filed Nov. 24, 1958, Ser. No. 776,078
Claims priority, application Sweden Dec. 2, 1957
8 Claims. (Cl. 179—100.2)

Figure 1:
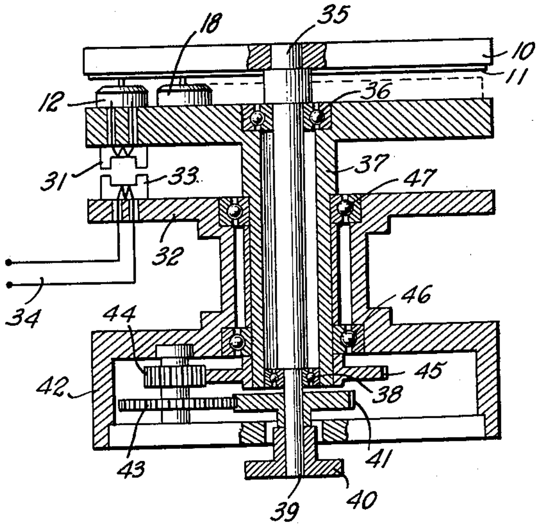

The present invention regards an arrangement for recording and for reproduction of electrical oscillations, preferably sound carrier oscillations. In this connection, within the conception oscillations shall also be included all different kinds of pulses or other variable electrical occurrences, which one will in practice record in order thereafter to reproduce.

The most usual method of recording and reproduction resp., of electrical oscillations of the kinds now concerned has hitherto been to register them on a material, which has been covered with or consisting of a permanent magnetizable material, a so called magnetogram carrier. Such magnetogram carriers consisted of for instance wire, tapes, discs, "cuffs" applicable on drums and the like. Regarding wire and tape one can use means controlled by the wire itself for keeping the wire in correct position relative to the recording or reproduction means, respectively and regarding tape one can in a corresponding way use means controlled by the edges of the tape for the same purpose. In such tapes, which recorded or were intended for recording of a plurality of parallel records, however, one has as a rule had to use specific control grooves which, in connection with control needles applied on the recording or reproduction means, respectively, centered the tape and the means in relation to each other and this has also been the case when using discs, which were, for this purpose, provided with a spiral formed groove or, when using cuffs respectively, which were for the same purpose provided with a groove running in screw form.

For some purposes, however, the question is one about reproduction of one and the same sound a very great number of times, for instance under given, repeatedly occurring periods during a long time. This can for instance be the case with automatic emergency signal transmitters for ships and airplanes, further in automatic telephone responders, time signal transmitters, weather forecast reporters for telephone use, further with automatic identification transmitters for radio stations and beacons and in automatic bearing indicators for directed radio beacons of the kind, which has been called speaking radio beacons, and also in a plurality of other cases.

Experience has now proved that the tenability of the recording means against wearing between the groove and the needle is insufficient, and that the means concerned have not unessential tendency to be used out by wearing of the said kind in short time, whereafter they, in some cases, will give non-understandable, but in more difficult cases even erroneous indications. It has therefore been proposed in order of preventing the wearing to remove the recording and reproduction head from the recording and reproduction means a distance in the order of magnitude of one or some hundred parts of a millimeter. It is true, that thereby a magnetic air gap is connected into the magnetic transfer way, but instead one gets sure against wearing of the said kind, and the life time of the recording means is correspondingly prolongated. This arrangement, however, in the forms of execution hitherto known has been rather unsatisfactory. The reason thereto was in the first place, that one had to introduce control means mechanically separate from the recording means (the tape, the disc, the cuff) in the form of the magnetogram carrier for providing the desired gearing between the reproduction means and the recording, said control means for instance being in the form of a continuously rotating control screw, the bearings of which were subject of wearing and therefore continuously caused displacements and ambiguity regarding the mutual coincidence between the position of the magnetogram carrier and the reproduction means and further for each new reproduction of the sound record, the reproduction means have to be displaced into its initial position which was combined with rather great mechanical, technical difficulties, and could not be insured with the required precision even with very complicated arrangements.

As an example it may be assumed, that the sound record representing magnetization is made on a drum with a screw groove, which rotates with 180 turns, when a speaking radio beacon, which should reproduce the sound record, rotates one turn of 360°. Sound for the creation of the bearing shall then be transmitted each 20th degree or with other words eighteen times pro turn of the rotation of the radio beacon, and thereafter the reproduction means shall be brought to its initial position, but if now the back movement in some case should take place with an error of only one single turn on the drum, then immediately an indication error of the bearing of 2° will be created. If the back space error of the reproduction means should be erroneous with two turns on the drum, then a bearing error of 4° will be created and so on.

One has hitherto had no success in constructing a reliable arrangement for return movement of the reproduction means.

The present invention regards an arrangement with which one will effectively avoid the abovementioned difficulties. The arrangement according to the invention, which is intended for recording and reproduction of electrical pulses or signs, especially sound carrying oscillations, which are introduced on a sound carrier is provided with a plurality of circularly running, endless channels, which are not combined with each other.

According to the invention the arrangement comprises a number of sound recording or sound reproduction means, respectively, so-called transducer heads corresponding to the number of channels, each for cooperation with one channel, and a transformatory switch arrangement for putting the said means into activity in successive consequence, said arrangement consisting in a primary transformer half part for each sound recording or sound reproduction means, respectively, and one single (or eventually a small number of) secondary transformer half parts. The primary transformer half parts and the secondary transformer half parts are thereby arranged in such a way on parts, which are movable in relation to each other, that the secondary transformer half part or parts, respectively, will successively get into magnetic cooperation with the one of the primary transformer half parts after the other one.

By the abovementioned arrangement one will amongst others gain the advantage, that one need not use any slide contacts. The commutator, which normally contained slide contacts for successively transferring the record from the different channels, thus is here replaced by a magnetic commutator, which does not create any disturbances.

Figure 2:
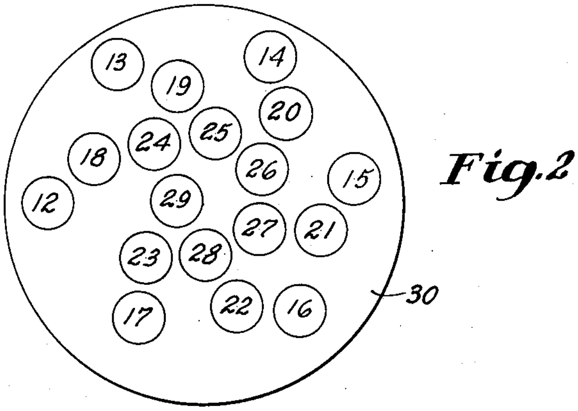
Figure 3:
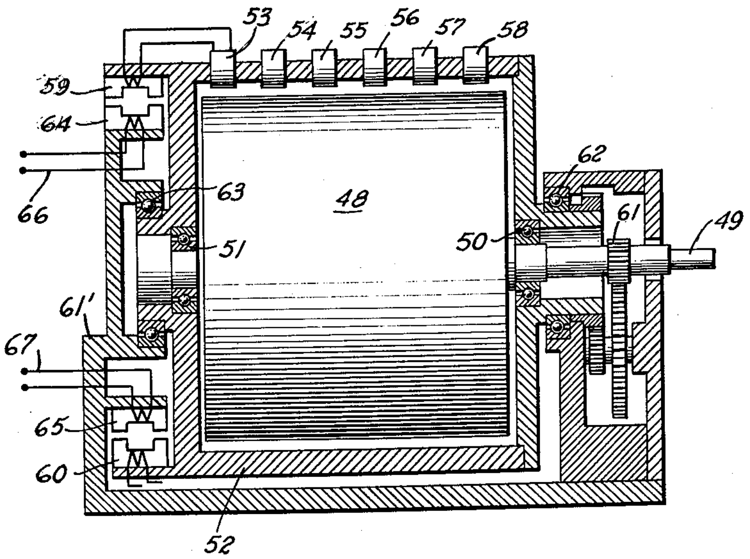
Figure 4:
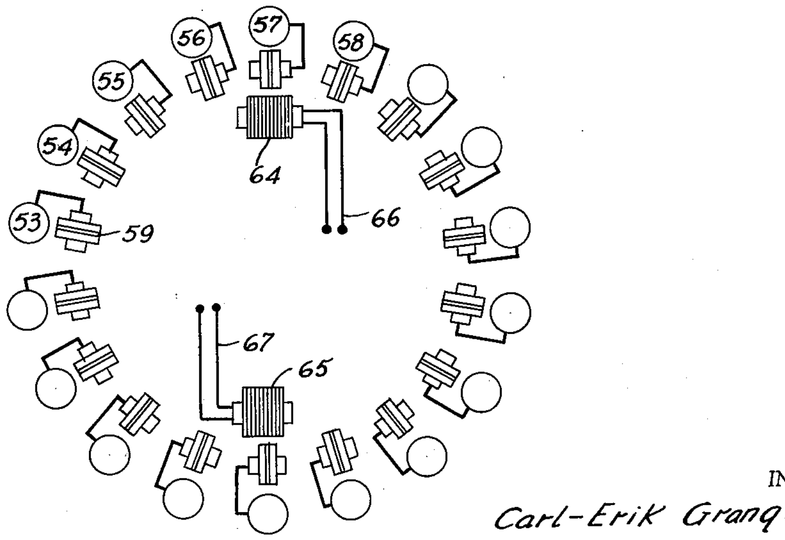

The invention will below be further described in connection with two different forms of execution, both intended for the reproduction of a magnetic record, intended for the bearing statement transmission from a speaking radio beacon, but the invention is of course not limited just to this specific use. The description will take place in connection with the attached drawings, in which FIG. 1 shows a first form of execution of the invention in vertical projection, partly in section, and FIG. 2 shows the same arrangement in horizontal projection, whereas FIG. 3 shows an alternative arrangement in vertical projection and partly in section, and finally FIG. 4 shows a development in the plane for explaining the arrangement according to FIG. 3, however in a smaller scale.

In FIG. 1 the magnetogram carrier is formed by a disc 10 of a material, which is exceptionally constant as to its size, and preferably is non-magnetic, on the lower side of which there is provided a layer of magnetizable material 11. A number of eighteen transducer or reproduction heads 12–29, see FIG. 2, are arranged on a second disc 30, which is supposed, for simplification of the description, to be in connection with the standard of the apparatus and consequently not rotating. The eighteen transducer or reproduction heads are placed in such a way, that each of them will pick up one groove on the magnetogram carrier. Thus, the transducer head 12 cooperates with the outermost groove, whereas the transducer heads in turn thereafter cooperate with grooves further in, so that finally the transducer head 29 will cooperate with the innermost groove. On the under side of the disc 30 a number of magnets are arranged in a ring on the same diameter, said magnets being of horse-shoe-form, one of said magnets 31 being visible in FIG. 1. Said magnets are combined with the reproduction windings of the transducer heads 12–29 in such a way, that the records will be reproduced in the correct consequence of time. For instance the magnet 31 may be combined with the transducer head 12, the next magnet following thereafter in clockwise direction may be combined with the transducer head 13, which is one groove further inwards on the disc 30 and so on, but it is also possible to combine the magnet with the transducer head 18, in which case one has to take care, that the groove on the layer 11 of the disc 10, with which the transducer head 18 cooperates, shall contain the sound to be reproduced next in consequence after the sound reproduced by the transducer head 12.

Under the disc 30 a further disc 32 is provided, which carries on its upper side one single horse-shoe-formed magnet 33, the poles of which are placed in such a way, that they exactly correspond in radial direction to the poles of the magnet 31, when they pass each other. All of the concerned magnets being made of weak transformer plate in laminated form, the two magnets will serve as a transformer the primary winding of which being connected to the transducer heads, and the secondary winding of which being connected to the conduits 34 to the modulator of the speaking radio beacon.

A gear device is provided for driving the discs 10 and 32, so that the magnet 33 will successively cooperate with one of the magnets 31 after the other one. The shaft 35 of the disc 10 is thus running through a bearing 36 in the disc 30 and through the hub 37 rigidly connected to said disc, said hub being provided at its lower end with a further bearing 38. The shaft prolongation 39 carries one coupling half part 40, which is intended to be connected to the driving shaft of the apparatus, and also a cog wheel 41, interacting with a cog wheel 43, which is otherwise freely geared in the casing 42. On the same shaft also a cog wheel 44 is mounted, which is coacting with the cog wheel 45, mounted on the hub 37. It is easily seen, that due to this arrangement of the cog gearing the discs 10 and 32 will rotate in relation to the fixed disc 30. The numbers of cogs in the cog wheels concerned are now so chosen, that during the time when the disc 10 is rotating eighteen turns for reproduction of all the eighteen recorded bearing statements the disc 32 will rotate one turn. It will therefore during each turn be situated with its secondary half part 33 of the transformer in magnetic connection with in turn after each other each separate one of the eighteen primary half parts 12–29 of the transformers.

In practice the now described arrangement, which is only described for simplification of the description, is of course not especially advantageous. As a matter of fact, if the disc 32 is in rotation, then slip ring contacts must be provided for transferring the received audio frequency voltage to the modulator of the beacon. Therefore it is more suitable to arrange the disc 32 in rigid connection with the frame of the apparatus. Then, instead, the disc 30 will rotate one turn, whereas the disc 10 rotates nineteen turns, and the total difference in numbers of turns between the discs 11 and 30 of eighteen turns will be created, so that all of the eighteen bearing statements can be reproduced.

Some speaking radio beacons are arranged in such a way, that they only transmit a bearing statement in one direction, viz. in the direction, onto which the transmitter side of the transmitter antenna is accidentally turned. Regarding that one is as a rule using a dipole antenna construction as transmitter antenna, this can however easily be arranged in such a way, that one will transmit from its one side the bearing statement about the direction, onto which this side is turned, and simultaneously from its other side transmit the contra bearing statement, as described in my U.S. patent specification 2,744,246. Such an arrangement is easy to provide by a modification of the arrangement according to FIG. 1. Thereby as a matter of fact, one must only provide a complementary secondary part to the transformer part 33 but displaced along the periphery of the disc 31 by 180°, and thereafter one can get the contra bearing statement from its winding.

Between the parts 30, 37 on the one side, and the parts 32, 42, on the other side, bearing arrangements are provided. These may consist in ball bearings 46 and 47. The bearings 36 and 38 are also preferably made as ball bearings.

FIGS. 3 and 4 show an arrangement of a mainly corresponding kind, provided for reproduction of a sound recorded on a drum with a cuff. The drum 48 is driven by means of the shaft 49, and by means of the ball bearings 50, 51 it is geared in the casing 52 carrying the transducer heads. The transducer heads may suitably be arranged along generatrix lines displaced by 120° around the circumference of the casing 52, with six transducer heads in a row in each line, displaced in such a way, that all of the sound records will be reproduced in turn after each other. Six such transducer heads 53–58 arranged in a row are visible in FIG. 3. Each such transducer head is combined with a primary transformer half part on the inner side of a cup-formed spacing, arranged at the one end wall of the drum 52. Due to the sectioning in the drawing, only two of these primary transformer half parts 59 and 60, respectively, are visible. The transformer half part 59 is combined with the transducer head 53.

By means of a cog gearing 61, which is made in all essential parts the same way as the one, described in connection with FIG. 1, and which should therefore need no renewed description in this connection, the drums 48 and 52 are arranged to rotate the one with eighteen turns, which is equal to the number of recording channels, simultaneously as the other one rotates with one turn in the one or the other direction, in both cases relative to the frame 61' of the apparatus, which is, by means of the ball bearings 62 and 63, carrying the drum 52. In the frame 61' in this case two diametrically opposite secondary transformer half parts 64, 65 are arranged, which feed the conduits 66, 67 to the modulators, causing the oscillation composed by a carrier wave and an audio frequency wave, which shall be transmitted by the directional radio beacon.

FIG. 4 shows the secondary transformer half parts 59, developed in the plane and arranged in a circle. Further the sound record transducer heads 53–58 as well as other such heads, which are not visible in the drawing, are schematically indicated although not in the correct orientation. One will observe, that the core of the secondary transformer part 64 or 65, respectively, is essentially broader than the corresponding core of the primary transformer part. The purpose of making the core of the secondary transformer part so broad is that it is bridging over about one division between two adjacent primary transformer parts, so that a practically continuous transfer shall be obtained from the cooperation of the secondary part with one primary part, for instance the part 57, and the cooperation of same secondary part with the next primary part in the chosen example thus the part 58. Thereby one is avoiding the necessity of an otherwise required pause in the spoken sound during the transfer.

Of course the invention is not limited to the form of execution above described in detail, of which two different examples have been shown in the drawings, but different modifications may occur within the frame of the invention. The invention is also not limited to the use in connection with speaking radio beacons, as little as it is limited to the use of magnetic records.

What I claim is:

1. An arrangement for recording and reproduction of electrical pulses comprising a rotatable sound carrier having disposed thereon a plurality of independent continuously running sound channels, transducer heads operatively associated with each of said channels, switching means for utilizing each of said transducer heads in succession, said switching means including a plurality of primary transformer core portions connected to each of said transducer heads, means for causing a relative movement between said sound carrier and said primary transformer core portions, a secondary transformer core portion movable in relation to said sound carrier, and means for successively effecting a magnetic coupling between said primary core portions and said secondary core portion.

2. An arrangement according to claim 1, wherein said sound carrier is a plane disc and said sound channels are disposed in concentric circles on the surface of said disc.

3. An arrangement according to claim 1, wherein said sound carrier is a cylindrical drum and said sound channels are disposed in parallel coaxial circles around the circumference of said drum.

4. An arrangement according to claim 1, wherein the electrical pulses are magnetically recorded on said sound carrier.

5. An arrangement according to claim 1, wherein the primary core portions and said sound carrier are movable relative to each other at a different rate than said secondary core portion.

6. An arrangement according to claim 5, wherein the ratio of relative movement of the transformer core portions is $n:n-1$, $n$ being the number of said sound channels.

7. An arrangement according to claim 1, wherein said secondary core portions are of greater width than said primary core portions.

8. An arrangement according to claim 7, wherein the width of said secondary core portions is approximately equal to the width of the space between said primary core portions.

References Cited in the file of this patent

UNITED STATES PATENTS

| | | |
|---|---|---|
| 2,831,180 | Hasbrouck | Apr. 15, 1958 |
| 2,909,616 | Marty | Oct. 20, 1959 |

FOREIGN PATENTS

| | | |
|---|---|---|
| 760,874 | Great Britain | Nov. 7, 1956 |